May 23, 1950
H. A. McANINCH
2,508,832
COUPLING DEVICE
Filed Aug. 28, 1948
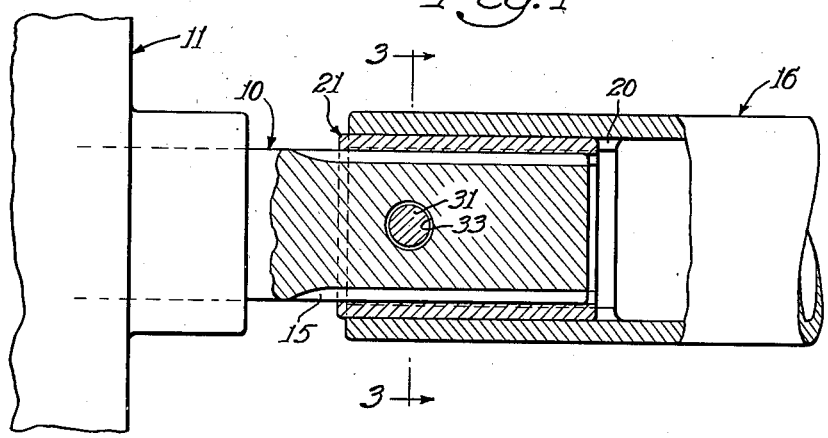
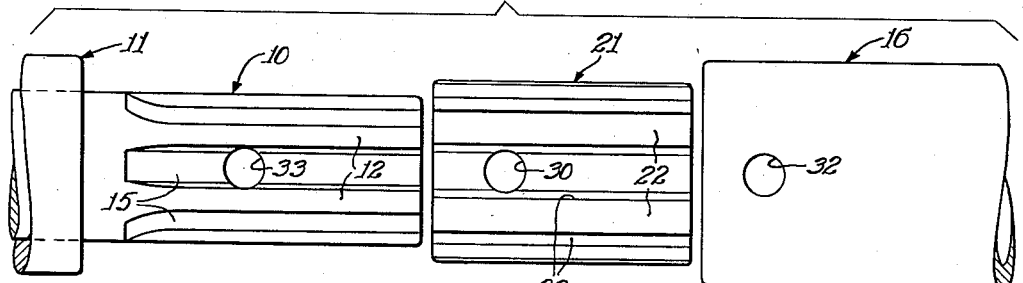
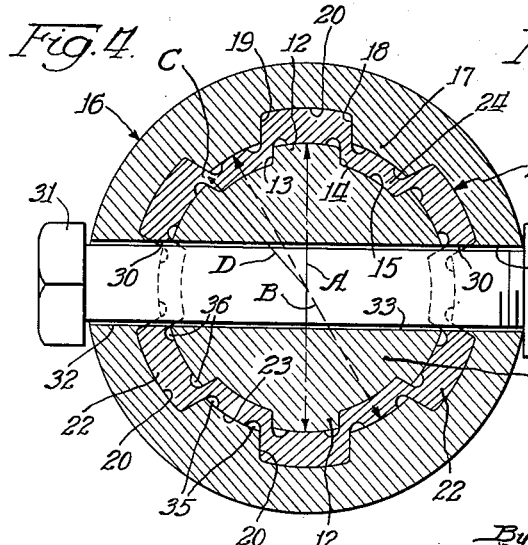
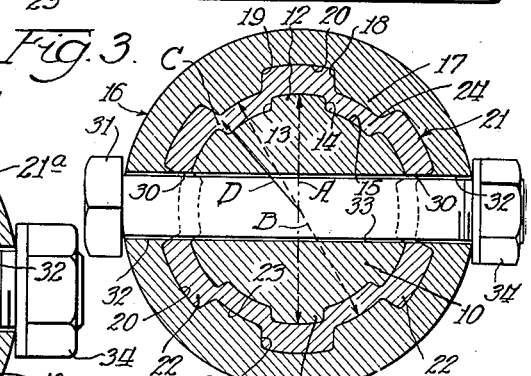
Inventor:
Herbert A. McAninch
By Edward C. Fitzhugh
Atty.

Patented May 23, 1950

2,508,832

UNITED STATES PATENT OFFICE 2,508,832

COUPLING DEVICE

Herbert A. McAninch, Auburn, Ind., assignor to Borg-Warner Corporation, Chicago, Ill., a corporation of Illinois Application August 28, 1948, Serial No. 46,630

6 Claims. (Cl. 287—1)

1

The present invention relates to a coupling device and more particularly to such a device for connecting shafts of a power-producing unit, for example, a tractor, and a power-utilizing mechanism, such as a combine or other farm implement.

Power producing units, such as tractors, are often provided with power take-off shafts from which power can be transmitted to a power-utilizing mechanism. For example, a tractor is usually provided with a hitch by means of which a load may be connected thereto to be pulled thereby, and is also provided with a rearwardly directed shaft, termed a take-off shaft, by means of which power generated by the tractor may be transmitted to a combine, baler, or other farm implement, for the purpose of rotating certain mechanism carried thereby and instrumental in effecting operation thereof. It will, therefore, be apparent that the tractor performs the dual functions of pulling a power-utilizing unit, such as a corn picker or other farm implement, and the tractor may either simultaneously or separately effect operation of a farm implement by means of a coupling connecting the power take-off shaft of the tractor to a power-receiving shaft of the farm implement.

However, power generating units, such as tractors, made by different companies, have splined power take-off shafts of different diameters, the shaft associated with each tractor being adapted for use only with the shafts of the power driven machines, such as corn pickers and combines, made by the manufacturer of the tractor but, due to the difference in diameters, cannot be used with power-driven machines made by another tractor company in view of the inability of the take-off shaft of a tractor made by one tractor company to establish a mating and satisfactory connection with the power-receiving shaft of a corn picker or other farm implement made by another tractor company. It frequently occurs that operators, such as farmers, desire to use, or are required to use, a power driven machine, made by one of the companies, with a power generating unit made by another of the companies, and, in this case, it is not possible to do so without making major changes in the power take-off system of the power generating unit inasmuch as the diameter of the power take-off shaft thereof is either too large or too small to be connectible with the drive shaft of different diameter of the power driven machine.

It is an object of the present invention to provide a power-transmitting coupling device for connecting driving and driven shafts of different diameters.

Another important object of this invention is to provide a power-transmitting coupling device for connecting a splined driving shaft and a hollow tubular splined driven sleeve shaft and which drive shaft and driven shaft has such external and internal diameters, respectively, prohibiting engagement, or satisfactory power-transmitting engagement of their splines with each other.

Another object of this invention is to provide a power-transmitting coupling device comprising a tubular member corrugated to provide axially extending outer and inner splines respectively engageable with splineways in sleeves and stub shafts of different diameters of power driven and power-producing machines.

A further object of this invention is to provide such a power transmitting coupling device for the purpose described, which is simple and compact in construction and capable of being inexpensively manufactured and readily and easily assembled with shafts of different diameters, as well as providing certain other new and useful features as hereinafter more fully set forth and particularly pointed out in the appended claims, reference being had to the accompanying drawing in which:

Fig. 1 is a central longitudinal section through a structure embodying the present invention, partly in elevation;

Fig. 2 is a side elevation of the structure shown in Fig. 1, with the parts of the structure being separated to more clearly illustrate the formation thereof;

Fig. 3 represents a transverse section taken substantially along the plane indicated by the line 3—3 of Fig. 1; and Fig. 4 is a transverse section of a modification of the invention illustrated in Figs. 1, 2 and 3.

Referring to the drawing, there is illustrated a driving member 10 which may be connected to and adapted to be rotated by a power-producing mechanism, such as a tractor, (not shown) for example, the member 10 may be a power take-off shaft drivingly connected to the power member, generally indicated at 11 and forming a portion of mechanism, such as the engine of tractor. The driving member 10 is in the form of a stub shaft and is provided with a plurality of external longitudinally extending integral ribs or splines 12 defining the sides 13 and 14 of grooves or splineways 15 in the outer circumference of the shaft.

A power-utilizing mechanism is usually provided with a driven member, such as the shaft 16, in the form of a tubular or sleeve member, telescopically receiving the drive shaft 10 and having internal longitudinally extending splines 17 defining sides 18 and 19 of splineways or grooves 20 in the inner circumference of the shaft 16.

Power-producing mechanisms, such as tractors, manufactured by one company, are usually provided with splined take-off power shafts of one diameter, adapted to interfit with the splines of sleeve shafts of power-utilizing mechanisms, such as corn pickers or other farm implements, manufactured by the same company. However, power take-off shafts of tractors, manufactured by different companies, vary in diameter, and the take-off shafts cannot be connected to the sleeve shafts of power-utilizing mechanisms manufactured by another company and having a substantially greater internal diameter than the diameter of the take-off shafts. As it is frequently desirable and expedient, and in some cases necessary, to employ such specifically indicated power-producing and utilizing mechanisms which are respectively made by different companies and have shafts of different diameters, the operator, or farmer, is presented with the problem of providing means affording a suitable satisfactory connection between the shafts for the transmission of power from the tractor to the farm implement. This condition is illustrated by a consideration of Figs. 1 and 3, wherein the diameter of the stub shaft 10, indicated at A, is less than that of the internal diameter of the sleeve shaft 16, indicated at D, so that the splines on either of the shafts will not fit within the splineways in the other shaft, and it is thus impossible to obtain a satisfactory power-transmitting connection between these shafts.

The present invention resides in the provision of a simple and inexpensive coupling device for connecting a splined stub shaft, such as shaft 10, of a power generating mechanism with a splined sleeve shaft, such as the shaft 16, of a power-utilizing mechanism, where, as in the present case, the diameter of the take-off shaft is smaller than the internal diameter of the sleeve shaft so as to prohibit fitting of the splines in one of the shafts in the splineways in the other shaft, with consequent failure of a satisfactory power-transmitting connection between the shafts. The coupling device of the present invention comprises a splined tubular member adapted to provide power-transmitting means for use between the driving or power take-off shaft 10 of a power generating unit and the driven shaft 16 of a power-utilizing unit. For this purpose, the tubular member 21 is provided with external longitudinally extending splines 22, defining the sides of splineways 23, and formed to be received within the splineways 20 of the driven member 16 for engagement with the sides 18, 19 of the splineways 20 in the driven member 16. The tubular member 21 is also provided with internal longitudinally extending splines 24 received within the splineways 15 and engaging the sides 13 and 14 of the splineways 15 in the stub shaft 10. It will thus be apparent that the external splines 22 and the intervening splineways of the member 21 may be slidably fitted to and interengage with the splineways 20 and splines 17, respectively, of the sleeve shaft 16, and also that the internal splines 24 and the splineways spacing the same, of the member 21 are fitted with the splineways 15 and splines 12 of the stub shaft 10 whereby the coupling member 21 will connect the shafts 10 and 16 in torque-transmitting relationship. It may be noted from a consideration of Fig. 3 that the splines and splineways spacing the same of the tubular member 16 are substantially larger than the splines 12 and splineways 15 on the stub shaft 10 inasmuch as each of these shafts have their splined diameters formed to interengage and fit the splineways and splines of another shaft of a power generating or driven mechanism manufactured by the same company. The improved coupling device of the present invention and comprising the coupling member 21 is advantageously formed to provide for this discrepancy of the different circumferential extents of the splines and splineways of the respective shafts, such as shafts 10 and 16, by having its external splines 22 circumferentially alternately arranged with respect to the internal splines 24 with the circumferentially spaced ends of each of the external splines forming a continuation of the adjacent circumferentially spaced ends of the internal splines and the circumferentially spaced ends of the base of each external spline being connected to the two circumferentially spaced and adjacent ends of the bases of two internal splines, the connection between adjacent splines, the connection between adjacent ends of an internal spline and an external spline being at a point C lying in a plane intermediate the inner surface of the sleeve shaft 16 and the spaced outer surface of the shaft 10, as indicated by the radius line D. The bases of the external splines are thus disposed radially inwardly of the bases of the internal splines, and the bases of all of the splines are disposed in substantially common circumferential alignment. This formation of the member 21 is of such character as to provide a cylinder which may be said to be corrugated to provide the circumferentially alternately arranged external and internal splines 22 and 24 connected at the juncture of the base of each spline with the adjacent ends of the bases of two other splines and forming a continuation thereof, as indicated at C in Fig. 3.

It thus will be apparent that the external splines 22 of the member 21 are of such circumferential extent as to snugly fit within the splineways 20 of the sleeve shaft 16, and the internal splines 24 of the member 21 are positioned within the splineways 15 of the shaft 10, the connection, indicated at C, between the ends of the external and internal splines connecting the same, whereby the member 21 will satisfactorily transmit torque from the driving shaft 10 to the power-receiving shaft 16. The formation of the coupling member 21, as described, is particularly advantageous when the internal diameter of a sleeve shaft is only slightly larger than the diameter of a stub shaft and the circumferential extent of the splineways of a sleeve shaft is greater than that of the splines of a stub shaft so that the splines extend and loosely fit within the splineways of the sleeve shaft.

After the coupling has been formed, it is desirable to heat treat the same to insure surface hardness and high yield point. In the heat treating operation, it frequently occurs that the external and internal splines do not have the true pitch circles they had before the heat treating operation. However, this is inconsequential inasmuch as the connecting portions C, connecting the outer and inner splines of the coupling, have sufficient flexibility to conform the coupling to the internally pitched diameter of the stub shaft and the externally pitched diameter of the sleeve shaft. This flexibility, it will be appreciated, is a necessity in order that the load may be distributed on all the connected splined members.

In order to avoid axial displacement of the shafts 10 and 16 and the coupling member 21, the coupling member 21 is provided with diametrically opposite openings 30 therein, each opening 30 being formed between two external splines 22 thereof and extending through two internal splines 24 thereof, and a bolt 31 extends through these openings 30, as well as openings 32 in the sleeve shaft 16 and through an opening 33 in the shaft 10 in alignment with the openings 30 and 32 in the coupling member 30 and the sleeve shaft 16, respectively, a nut 34 being threaded onto the projecting end of the bolt 31 and cooperating with the head of the bolt 31 to prevent movement of the bolt 31 relative to the shafts 10 and 16 and the coupling member 21. The shafts 10 and 16 and the coupling element 21 are thus restrained against axial movement relative to each and thereby maintained in assembly during the transmission of power between the shafts 10 and 16.

In the modification of the invention illustrated in Fig. 4, it may be noted that the coupling member 21a differs from the coupling member 21 of Figs. 1–3, by being provided with grooves 35 formed in each external splineway 23 thereof at the juncture of its circumferentially spaced ends with the sides of external splines 22, and also the coupling member 21a is provided with grooves 36 in each internal splineway thereof at the circumferentially spaced ends of the splineway adjacent the sides of the splines 24. These grooves 35 and 36 extend from one end to the other of the coupling member 21a. This feature is of particular advantage for the reason that the addition of these longitudinally extending grooves serves the purpose of reducing the extreme high stress concentration at the internal and external spline-connecting portions indicated at C, where the load is transferred from the inner splines to the outer splines of the coupling. This reduction of the stress concentration is very desirable inasmuch as the external and internal splines, at the circumferentially spaced edges of each spline, are directly connected without an intervening annular ring connecting the internal and external splines of the coupling.

More particularly, it may be noted that in the transmission of power from the stud shaft to the sleeve shaft, each of the splines of the coupling is required to transmit the power to the next adjacent spline of the coupling which may be either the internal or external spline of the coupling connected thereto, and for this reason, it is desirable that the stress concentration at the points C, connecting the external and internal splines, be as low as possible. The formation of the grooves permits a more uniform distribution of the stresses in the transition zones (C) between the outer and inner splines of the coupling.

It is believed that the foregoing conveys a clear understanding of the objects prefaced above, and while they have shown but a single embodiment of the invention, it will be manifest that other applications may be made with appropriate changes and details without departing from the spirit and scope of the invention as expressed in the appended claims.

I claim:

1. A coupling for interconnecting two splined elements, comprising a hollow tubular member having a plurality of longitudinally extending external and internal splines, said internal splines being circumferentially alternately arranged with respect to said external splines, the circumferentially spaced ends of the base of each external spline terminating at and being connected to the circumferentially spaced and adjacent ends of the bases of two internal splines.

2. A coupling for interconnecting two splined elements comprising a hollow tubular member having a plurality of longitudinally extending external and internal splines, said internal splines being circumferentially alternately arranged with respect to said external splines, each external spline being connected at the circumferentially spaced ends of its base with the circumferentially spaced and adjacent ends of the bases of two internal splines, said connection between each internal and external spline being sufficiently flexible to provide for circumferential expansion of the member.

3. A coupling for interconnecting two splined elements comprising a hollow tubular member having a plurality of longitudinally extending external and internal splines, said internal splines being circumferentially alternately arranged with respect to said external splines, said splines of said member being disposed in different radial planes and with the bases of said external splines being disposed radially inwardly of the bases of the internal splines.

4. A coupling for interconnecting two splined elements comprising a hollow tubular member having a plurality of longitudinally extending external and internal splines, said internal splines being circumferentially alternately arranged with respect to said external splines, said splines of said member being disposed in different radial planes and with the bases of said external and internal splines being disposed in substantially common circumferential alignment.

5. A coupling for interconnecting two splined elements comprising a hollow tubular member having a plurality of longitudinally extending external and internal splines and splineways, said internal splines being circumferentially alternately arranged with respect to said external splines, each of said internal and external splineways of said member having grooves therein extending axially from one end to the other of said member.

6. A coupling for interconnecting two splined elements comprising a hollow tubular member having a plurality of longitudinally extending external and internal splines and splineways, said internal splines being circumferentially alternately arranged with respect to said external splines, and each external spline of said member being connected at opposite ends of its base with the adjacent ends of the bases of two internal splines of said member whereby each external spline of said member is in radial alignment with, and defines the bottom of, an internal splineway of said member, and each internal spline of said member defines the bottom of an external splineway in said member in radial alignment therewith, said member having spaced grooves extending longitudinally thereof with each groove being disposed substantially at the connection of the base of each one of the external and internal splines of the member with the base of the adjacent other of the external and internal splines of said member.

HERBERT A. McANINCH.

REFERENCES CITED

The following references are of record in the file of this patent:

UNITED STATES PATENTS

| Number | Name | Date |
| --- | --- | --- |
| 2,337,368 | Bohler | Dec. 21, 1943 |
| 2,443,688 | McFarland | June 22, 1948 |
| 2,466,097 | Graue | Apr. 5, 1949 |